United States Patent [19]

Moslehi et al.

[11] Patent Number: 6,004,029

[45] Date of Patent: Dec. 21, 1999

[54] METHOD FOR AUTOMATED CALIBRATION OF TEMPERATURE SENSORS IN RAPID THERMAL PROCESSING EQUIPMENT

[75] Inventors: Mehrdad M. Moslehi, Los Altos; Yong Jin Lee, San Jose, both of Calif.

[73] Assignee: CVC Products, Inc., Fremont, Calif.

[21] Appl. No.: 08/680,244

[22] Filed: Jul. 10, 1996

Related U.S. Application Data

[60] Provisional application No. 60/000,989, Jul. 10, 1995.

[51] Int. Cl.[6] .......................... G01K 15/00; H01L 21/02; F27D 11/00
[52] U.S. Cl. .............................. 374/1; 392/416; 219/390; 374/141; 427/521; 427/557; 438/796
[58] Field of Search ................. 374/1, 141; 392/416; 219/390; 427/521, 557; 438/796

[56] References Cited

U.S. PATENT DOCUMENTS

| | | | |
|---|---|---|---|
| 4,854,727 | 8/1989 | Pecot et al. .................................. | 374/57 |
| 4,969,748 | 11/1990 | Crowley et al. ............................. | 374/1 |
| 4,984,902 | 1/1991 | Crowley et al. ............................. | 374/1 |
| 5,265,957 | 11/1993 | Moslehi et al. ............................. | 374/1 |
| 5,305,417 | 4/1994 | Najm et al. ............................... | 392/418 |
| 5,326,170 | 7/1994 | Moslehi et al. ............................. | 374/2 |
| 5,436,494 | 7/1995 | Moslehi ................................. | 257/467 |
| 5,446,824 | 8/1995 | Moslehi ................................. | 392/416 |
| 5,539,855 | 7/1996 | Takahashi et al. ....................... | 392/416 |
| 5,601,366 | 2/1997 | Paranjpe ................................. | 374/126 |
| 5,635,409 | 6/1997 | Moslehi ..................................... | 438/7 |
| 5,715,361 | 2/1998 | Moslehi ................................. | 392/416 |
| 5,743,644 | 4/1998 | Kobayashi et al. ..................... | 374/126 |
| 5,848,842 | 12/1998 | Peuse et al. .............................. | 374/1 |

FOREIGN PATENT DOCUMENTS

| | | | |
|---|---|---|---|
| 170824 | 2/1986 | European Pat. Off. ............... | 374/141 |
| 617295 | 2/1949 | United Kingdom ................... | 374/141 |

*Primary Examiner*—Diego Gutierrez
*Assistant Examiner*—Stanley J. Pruchnic, Jr.
*Attorney, Agent, or Firm*—Gray Cary Ware & Freidenrich, LLP

[57] ABSTRACT

This invention presents an automatic calibration system and method for calibration of a substrate temperature sensor in a thermal processing equipment, such as a rapid thermal processing system. The calibration system includes a temperature-sensitive probe associated with the substrate temperature sensor to calibrate the substrate temperature sensor and an actuator to position the temperature-sensitive probe relative to the substrate during a calibration cycle. The actuator and temperature-sensitive probe of the automatic calibration system can be incorporated into the thermal processing equipment in order to maintain the thermal processing equipment cleanliness and integrity during a calibration cycle, and to allow rapid automated calibration. In the preferred embodiment of this invention, the temperature-sensitive probe and its actuator are implemented in the gas showerhead assembly of a rapid thermal processing system.

10 Claims, 5 Drawing Sheets

METHOD FOR AUTOMATED CALIBRATION OF TEMPERATURE SENSORS IN RAPID THERMAL PROCESSING EQUIPMENT

RELATED APPLICATION

This application claims priority under 35 USC § 119(e)(1) to provisional application number 60/000989, filed Jul. 10, 1995.

TECHNICAL FIELD OF THE INVENTION

The present invention relates to a system and method for microelectronics device fabrication and, more particularly, to an in-situ calibration system and method for autocalibration of temperature sensors such as multi-point pyrometry sensors in rapid thermal processing equipment.

BACKGROUND OF THE INVENTION

Most semiconductor fabrication processes (e.g., plasma etch, physical-vapor deposition, ion implant, micro lithography, plasma-enhanced chemical-vapor deposition, photoresist ash, etc.) in integrated circuit manufacturing have moved to single-wafer fabrication equipment in order to meet the stringent process control requirements for state-of sub-half micron semiconductor technologies. However, batch (or multi-wafer) furnaces still dominate thermal processing applications due to their throughput and relatively mature manufacturing equipment technology. Rapid Thermal Processing (RTP) provides single-wafer fabrication alternative to batch furnaces for various thermal processes used in semiconductor manufacturing processes, including rapid thermal anneals (e.g., transistor source/drain junction formation, implant anneal processes, and silicide formation), rapid thermal oxidation, and rapid thermal chemical-vapor deposition (RTCVD) processes (e.g., for deposition of polysilicon, silicon dioxide, silicon nitride, and amorphous silicon).

RTP systems usually employ optical or infrared pyrometry in order to measure the wafer temperature. Conventional RTP systems using pyrometry sensors suffer from wafer temperature uniformity and repeatability problems caused by emissivity-related pyrometry temperature measurement errors and lack of dynamic real-time wafer temperature uniformity control. The current inventors have also invented devices and methods for real-time measurement and compensation of pyrometry effects (in U.S. Pat. Nos. 5,443,315 and 5,444,815 that are hereby incorporated by reference). Even with real-time capability for compensation of the wafer emissivity effects, pyrometry sensors may experience long-term drift in their response, requiring corrective actions. Thus, RTP systems require frequent pyrometry sensor calibrations in order to ensure accurate and repeatable temperature measurements and to enable reliable temperature control. Precision calibrated pyrometry sensors are essential for dynamic wafer temperature uniformity control when using multi-point pyrometry probes in multi-zone RTP systems.

Conventional pyrometry calibration techniques typically employ wafers with bonded or electron-beam welded thermocouples (to be called TC-bonded wafers). TC-bonded wafers with one or multiple bonded thermocouples (usually Type K thermocouples with 0.005" diameter wires) are used to calibrate multiple point pyrometry probes. TC-bonded wafers with multiple bonded thermocouples require manual handling and manual loading inside the RTP process chamber. The thermocouple wires are manually extended from the bonded junctions on the wafer inside the RTP process chamber to the interface electronics and data acquisition system located outside the RTP chamber. This elaborate and time-consuming manual procedure employed in conventional RTP temperature sensor calibration methods has numerous drawbacks and limitations, particularly in semiconductor production environments.

One major drawback is the negative impact on overall equipment effectiveness and utilization. Manual loading and unloading of a TC-bonded wafer can result in significant equipment downtime and interruption of production flow. This resulting reduction in tool utilization and availability for production uses can increase the RTP equipment cost of ownership (CoO). Moreover, TC-bonded wafers are expensive (as much as several thousand dollars for wafers with several bonded thermocouples) and have limited thermal cycling lifetimes (particularly at higher temperatures such as $T > \sim 900°$ C. and/or in reactive oxidizing environments). This problem can further increase the RTP Cost-of-Ownership (CoO expressed as cost in dollars per wafer processed) due to increased cost of consumables for the RTP equipment.

Another problem with conventional RTP pyrometry sensor calibration techniques is the need to break the chamber vacuum in vacuum RTP systems (such as the RTP modules used in silicide and metallization cluster tools) when manually loading and unloading the TC-bonded wafers. In vacuum RTP systems, breaking the chamber vacuum requires a subsequent post-calibration chamber pump-down cycle in order to reestablish the chamber base pressure and required vacuum integrity. The extended equipment downtime due to the vent and pump cycles can increase the CoO.

Another significant problem with conventional RTP pyrometry sensor calibration techniques is exposing the RTP process chamber to the external atmospheric environment. Exposure of the process chamber to the external ambient environment can lead to moisture adsorption and contaminant introduction into the RTP process chamber. Contaminants that enter the process chamber can lead to contaminated wafers during production and subsequent manufacturing yield loss. Additionally, manual handling and loading/unloading of the TC-bonded wafer further increases the chance of progressively contaminating the TC-bonded wafer and subsequently compromising the RTP process chamber cleanliness. This can result in manufacturing yield loss and further degradation of the RTP CoO due to increased wafer defect density.

SUMMARY OF THE INVENTION

Therefore, a need has arisen for a precise substrate temperature sensor autocalibration technique that eliminates the need for TC-bonded wafers and manual handling (loading and unloading) of TC-bonded calibration wafers with respect to the RTP process chambers.

A further need exists for an RTP temperature sensor autocalibration apparatus and method that eliminates the need to expose the RTP process chamber to the external atmospheric ambient in RTP systems and associated atmospheric contaminants.

A further need exists for an RTP temperature sensor autocalibration apparatus and method that eliminates the need to break the RTP chamber vacuum (i.e., venting the RTP chamber to atmospheric ambient when loading/unloading of the TC-bonded wafer) in vacuum or low-pressure RTP fabrication equipment.

A further need exists for a substrate temperature sensor autocalibration apparatus and method that can perform rapid in-situ autocalibration of multi-point temperature sensors (e.g., multi-point pyrometry sensors) using in-situ sensor calibration devices in multi-zone pyrometry systems.

A further need exists for an RTP temperature sensor autocalibration apparatus and method that can perform multi-point RTP temperature sensor calibrations using a silicon wafer without bonded thermocouples that can be loaded and unloaded using an automated wafer handling system, such as in an RTP equipment with automated robotic wafer handling.

A further need exists for a substrate temperature sensor autocalibration apparatus and method with an extended useful thermal cycling lifetime and minimal degradation over that lifetime.

A further need exists for an RTP sensor autocalibration apparatus and method that eliminates the possibility of RTP chamber and process contamination due to the sensor calibration process A further need exists for an RTP sensor autocalibration apparatus and method that allows automated in-situ calibration of the RTP temperature sensors on a first calibration wafer loaded along with every wafer cassette to enable a rapid in-situ pyrometry calibration cycle prior to processing each batch of products wafers. Alternatively, this methodology may be used on only a fraction (e.g., one out of ten) wafer cassettes in production applications.

In accordance with the present invention, an RTP compatible substrate temperature sensor calibration system and method are provided that substantially eliminate or reduce disadvantages and problems associated with previously developed and known temperature sensor calibration techniques.

More specifically, a system is provided that calibrates substrate temperature sensor automatically. The calibration system includes a temperature-sensitive probe associated with the substrate temperature sensor to calibrate the substrate temperature sensor and an actuator to position the temperature-sensitive probe relative to the substrate during a real time in-situ calibration cycle. The actuator (for probe extension and retraction) and temperature-sensitive probe of the automatic calibration system can be incorporated into the thermal processing equipment such as in the RTP process chamber in order to maintain the thermal processing equipment integrity and establish enhanced calibration capability and functionality during a calibration cycle.

Also provided is a method that allows for automatic calibration of substrate temperature sensors such as pyrometry sensors in manufacturing equipment such as RTP systems. The method of the present invention involves extending a temperature-sensitive probe to a point near or contacting the substrate located within the manufacturing equipment process chamber, ramping the substrate temperature up and down, collecting temperature readings from both the substrate temperature sensor (or sensors) and the temperature-sensitive probe (or probes) using an automated data acquisition system, extracting the real-time calibration parameters over a finite or an extended temperature range for the substrate temperature sensor (or sensors) in the systems employing multi-point sensors, and retracting the temperature-sensitive probe (or probes) away from the substrate at the conclusion of the calibration cycle.

An important technical advantage of the present invention is that it provides an RTP-compatible substrate temperature sensor autocalibration technique that eliminates the need for TC-bonded wafers and manual handling (loading and unloading) of the TC-bonded calibration wafers. This eliminates the need to break the RTP chamber vacuum (i.e., venting the chamber to atmospheric ambient for loading/unloading of the TC-bonded wafer) in vacuum RTP systems.

Another technical advantage of the present invention is that it eliminates the need for exposure of the RTP process chamber to the external atmospheric ambient in atmospheric pressure RTP systems. This further eliminates the possibility of contamination introduction into the RTP chamber due to exposing the process chamber when manually handling TC-bonded calibration wafers. This greatly reduces RTP equipment and process contamination due to uncontrolled and/or unknown contamination sources.

The present invention provides the further technical advantage of a much longer useful calibration probe life, and negligible degradation of probe integrity over the lifetime of the calibration elements.

Yet another technical advantage of the present invention is that it provides a capability for rapid in-situ calibration of multi-point temperature sensors using in-situ sensor calibration devices. The present invention allows automated in-situ calibration of the RTP temperature sensors on a calibration wafer loaded along with some wafer cassettes to enable a rapid in-situ pyrometry calibration cycle prior to processing each batch of wafers (e.g., one periodic calibration for every 50–100 wafers).

Still another technical advantage of the present invention is that it allows multi-point RTP temperature sensor calibrations using any silicon wafer or other substrates (without bonded thermocouples) capable of being loaded into and unloaded from the RTP process chamber using an automated wafer handling system, such as a wafer handling robot.

BRIEF DESCRIPTION OF THE DRAWINGS

For a more complete understanding of the present invention and the advantages thereof, reference is now made to the following description which is to be taken in conjunction with the accompanying drawings.

DETAILED DESCRIPTION OF THE INVENTION

Preferred embodiments of the present invention are illustrated in the FIGUREs, like numerals being used to refer to like and corresponding parts of the various drawings.

CVC Products, Inc. (CVC) has designed and built a state-of-the-art multi-zone RTP system that overcomes temperature measurement and control problems in prior art commercial RTP systems, including the need for manually loaded TC-bonded wafers for pyrometry sensor calibration. CVC's RTP equipment design is based on the Universal Thermal Module™ (UTM™) technology and a unique backside/bottom wafer heating and frontside/top gas inject configuration using a highly reflective showerhead. In this configuration, the semiconductor wafer is placed face up (device side facing up and opposite the illuminator source) within the RTP chamber. The wafer is rotated using an ultraclean gearless rotation mechanism and heated on the backside by an axisymmetrical multi-zone illuminator through a substantially transparent quartz window. CVC's multi-zone illuminator employs multiple tungsten-halogen bulbs in five or six circular zones plus a single-bulb center zone for uniform heating of wafers up to 200 mm in diameter. This design can be scaled for processing larger wafers. For instance, 7–9 circular zones plus a single-bulb center zone may be used for uniform processing of 300-mm silicon wafers. The combination of an axisymmetrical RTP process chamber, vibration-free wafer rotation, and axisymmetrical multi-zone illuminator ensure an axisymmetric wafer temperature pattern, irrespective of the wafer backside and frontside emissivity conditions (even for non-axisymmetric wafer emissivity patterns).

The present invention provides an RTP-compatible substrate temperature sensor autocalibration system and method to calibrate substrate temperature sensors such as pyrometry sensors in thermal substrate processing equipment such as in RTP systems to achieve accurate and repeatable temperature measurements in an RTP system. One embodiment of the present invention employs at least one solenoid-actuated thermocouple calibration probe embedded within the RTP gas showerhead. In a multi-zone RTP system using multipoint pyrometry sensors, multiple solenoid-actuated thermocouple calibration probes may be used. For instance, CVC's multi-zone RTP system with a five-zone or six-zone illuminator and five pyrometry probes (to monitor the center-to-edge temperature profile) employs five solenoid-actuated thermocouple calibration probes embedded and distributed within the gas showerhead. This embodiment of the present invention is manufactured by CVC Products, Inc. as the Multi-Point Pyrometry Autocalibration (MultiPac™) system.

Figure 1:
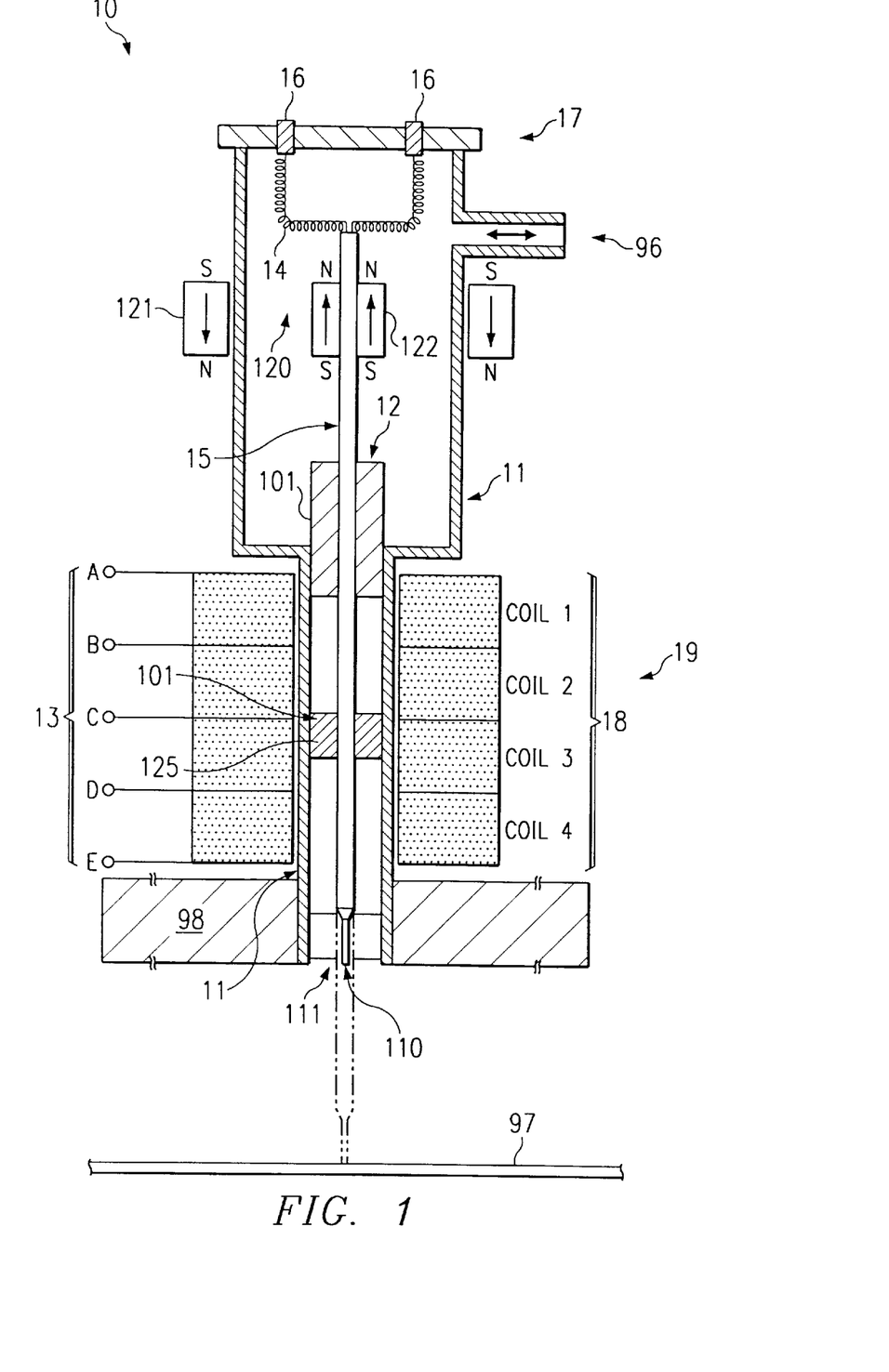
FIG. 1 shows a schematic view of one embodiment of the present invention.

FIG. 1 shows a schematic diagram of one embodiment of calibration probe 10 of the present invention including temperature sensing device 15 (thermocouple probe) contained within probe housing 11 and actuator 19. Temperature sensing device 15 of FIG. 1 comprises a solenoid-actuated thermocouple probe tip 110. Alternatively, other temperature sensing calibration devices such as a thermistor could be used in the present invention. Probe housing 11 can be constructed from a metallic tubing (preferably 316L stainless steel) with a circular diameter of 0.25" or less to contain solenoid-actuated thermocouple probe 15. The small diameter (e.g., <~1/16") thermocouple probe 15 may include a ceramic or metallic protective jacket. Cylindrical ferromagnetic jacket 12 can fixably attach to the thermocouple probe 15 to form a jacket such that movement up and down of ferromagnetic jacket 12 translates into movement up and down of thermocouple probe 15. The ferromagnetic jacket 12 thickness can occupy nearly the entire space between the outer diameter of thermocouple calibration probe 15 and the inner diameter of probe housing 11. Ferromagnetic jacket 12 can be constructed of nickel-plated iron or 1018 steel, and may be covered or coated with a thin layer 101 of Teflon (or other suitable material for low sliding friction) to provide smooth up/down actuation and motion of thermocouple probe 15 within the stainless steel tubing of probe housing 11.

Calibration probe 10 of the present invention should include thermocouple probe tip 110 (a thermocouple or other suitable sensor such as thermistor) with a very low thermal mass in order to minimize disturbance of the wafer temperature and to maximize the temperature measurement speed during an autocalibration process. The diameter of thermocouple probe tip 110 should be, preferably, less than 1 millimeter. Thermocouple probe tip 110 may be placed in a protective housing 111 within probe housing 11. Protective housing 111 may be made of ceramic, stainless steel, Mo, or a nonmagnetic refractory material such as nickel. A high thermal conductivity material is preferred for protective housing 111 in order to minimize any temperature calibration error.

In the embodiment of FIG. 1, thermocouple probe 15 includes thermocouple lead wires 14 that connect to feedthrough leads 16 on thermocouple vacuum-grade top flange 17 with thermocouple compatible feedthroughs. Thermocouple lead wires 14 have enough length between the point of connection with thermocouple probe 15 and vacuum-grade feedthrough lead 16 connections to allow full-scale up/down motion of thermocouple probe 15 between the fully extended (down) position and fully retracted (up) position. Forming thermocouple lead wires 14 into soft extendable springs will allow this movement without damage to the thermocouple lead wires and without providing excessive resistance to thermocouple probe 15 up and down motions as controlled by actuator 19. Calibration probe 10 shown in FIG. 1 includes pump/purge line 96 that allows calibration probe 10 to operate in a purged gas flow condition in an RTP system. This will eliminate the possibility of probe housing contamination or degradation over time due to process gases.

Actuator 19 shown in FIG. 1 comprises a cylindrical solenoid actuator 19 placed around probe housing 11. Solenoid actuator 19 may consist of a single solenoid coil 18 or, as shown in FIG. 1, a series of several solenoid coils 18. Solenoid coils 18, labeled coil 1–4, connect wires capable of carrying current to coil terminals 13, labeled coil terminal A–E. These coil terminals 13 receive electrical control signals in the form of electrical current and relay instructions. Coil terminal A connects to the top of coil 1, coil terminal B connects to the intersection of coil 1 with coil 2, coil terminal C connects to the intersection of coil 2 with coil 3, coil terminal D connects to the intersection of coil 3 with coil 4, and coil terminal E connects to the bottom of coil E. Coil terminals 13 couple solenoid coils 18 to an electric current source (or a plurality of current sources) that feeds current to solenoid coils 18. The current flow through solenoid coils 18 creates a magnetic field force emanating from solenoid 19 that moves thermocouple probe 15 by attracting or repelling ferromagnetic jacket 12 fixably attached to thermocouple probe 15 sidewall. As shown, the calibration probe 10 of FIG. 1 can employ two ring-shaped permanent magnets 121 and 122 which are vertically magnetized in opposite directions with respect to each other. The inner permanent magnet 122 is fixed to the probe 15 sidewall while the outer permanent magnet is fixed or mounted onto the probe housing 11. When the solenoid 19 does not receive an actuation electrical current, the attractive force between these two ring-shaped permanent magnets keeps the probe 15 in a normally retracted position.

Figure 2:
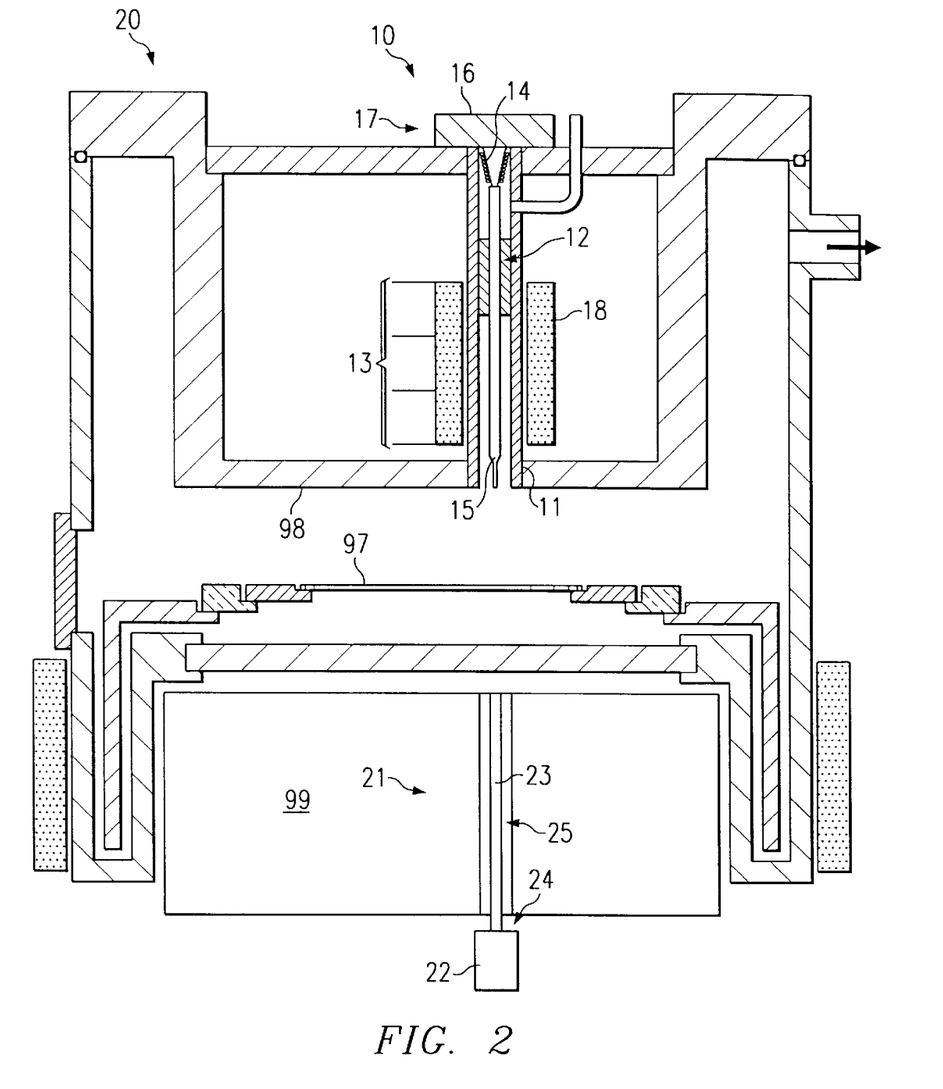
FIG. 2 illustrates a schematic diagram of an RTP system utilizing one embodiment of the present invention.

The schematic diagram of FIG. 2 shows an embodiment of the present invention installed in a multi-zone RTP system 20. RTP system 20 shown in FIG. 2 has a single pyrometry probe 21 associated with a single solenoid-actuated thermocouple calibration probe 10. Although only one pyrometry probe 21 and one calibration probe 10 are shown, the RTP system 20 can employ a plurality of pyrometry probes 21 and a plurality of calibration probes 10 particularly for a multi-zone RTP system configuration. In one embodiment, the RTP system 20 has five solenoid-actuated thermocouple calibration probes 10 associated with five pyrometry probes 21 in a multi-zone showerhead of an RTP system. Preferably, calibration probes 10 are positioned such that their axes are located directly along the axes of pyrometry probes 21. Pyrometry probe 21 shown in FIG. 2 includes pyrometry sensor 22 that can include optical fiber 23 and imaging lens 24 located within a light pipe housing 25 in illuminator housing 99 in order to image a finite size spot on the wafer backside (U.S. Pat. No. 5,317,656 provides a description of fiber-optic pyrometry probes that can be used in conjunction with the present invention). Each pyrometry sensor 22 can associate with a calibration probe 10 located on the same XY plane coordinates as the pyrometry probe 21. As shown in FIG. 2, the calibration probe 10 can be located on one side of the wafer 97, while the pyrometry sensor 22 is located on the opposite side of the wafer 97. The wafer 97 can include, for example, a semiconductor wafer, a flat-panel substrate, a data storage head substrate, or superconductor substrate.

During operation, at the same time pyrometry probes 21 image the wafer temperature distribution on the wafer backside, calibration probes 10 can extend to contact the wafer 97 to measure the wafer temperature distribution on the wafer frontside. If desired, a pyrometry probe 21 (with an associated calibration probe 10) can also measure the temperature of the actively heated wafer holder which may be made of a suitable material such as graphite or silicon carbide. The ability of the calibration probe 10 to integrate into the RTP system 20 (e.g., to be implemented in the gas showerhead design) eliminates the need to use TC-bonded wafers to perform a calibration cycle. This reduces RTP cost of ownership because TC-bonded wafers are relatively expensive and degrade rapidly over time and multiple thermal cycles to the point of needing replacement.

As indicated in FIG. 2, each solenoid-actuated thermocouple probe 10 can be welded or brazed to showerhead assembly 98 and positioned within a cavity cut out of gas showerhead assembly 98 through which thermocouple probe 15 will access wafer 97. Depending on the design of the solenoid and positioning of the ferromagnetic jacket 12 on probe 15, the solenoid can operate in one of two modes. In one mode, the ferromagnetic jacket 12 is mounted on the probe 15 such that it is positioned substantially above the center of the solenoid when the solenoid is in the retracted position. In this mode, the probe is normally retracted by the retraction or compression force of a magnet part (e.g., magnets 121 and 122) or a compression spring when the solenoid is not powered. By powering the solenoid, the probe is pulled down and extended towards the wafer. This is the design mode shown in FIGS. 1 and 2. In another mode, the ferromagnetic jacket is positioned at a lower position such that it is nearly centered within the solenoid when the probe 15 is retracted. In this mode, lack of power to the solenoid will allow the probe 15 to land on the wafer by its weight. When electrical current runs through the solenoid coil(s), a magnetic force drives ferromagnetic jacket 12 to the center of solenoid actuator 19 representing the minimum energy position. As shown in the schematic of FIG. 1, this condition corresponds to the extended or activated position where thermocouple probe 15 is extended out of the gas showerhead plate 98 in order to contact the wafer surface. In practice, in order to perform an autocalibration cycle, thermocouple probe 15 can be lowered by ramping up the electrical current applied to solenoid actuator 19 until thermocouple probe 15 makes a soft contact landing on the wafer. Solenoid actuator 19 can control the landing impact force of the thermocouple probe 15 to avoid damaging wafer 97. The probe contact force is controlled by controlling the amount of solenoid current, or by the probe weight. When electrical current passes through solenoid 19, the magnetic force holding ferromagnetic jacket 12 extends thermocouple probe 15 to contact the wafer 97 frontside to perform an autocalibration cycle. After completion of the autocalibration routine, thermocouple probe 15 is retracted by successively ramping up an electrical current through upper sections of solenoid actuator 19 which, in turn, produces an upward moving magnetic field around solenoid actuator 19, forcing ferromagnetic jacket 12 and thermocouple probe 15 to rise back up to the retracted position. The probe 15 remains in the retracted position even after turning off the solenoid power due to the attractive force between magnets 120 and 121. The automated operation of calibration probe 10 by means of remote input of currents to the solenoid sections eliminates the requirement to manually load TC-bonded wafers to perform a calibration cycle. This allows in-situ calibration of the RTP system temperature sensors without breaking the process chamber vacuum (thereby preventing degradation of the process chamber cleanliness by eliminating exposure to the outside atmospheric environment).

In practical applications, only one or two autocalibration routines may be performed in a week (or less than 10 minutes during a 168-hour period). This corresponds to about 0.1% of the machine time. As a result, a more preferred design implementation will be to extend the in-situ thermocouple probes when electrical currents are passed through the solenoids, and to retract the probes when the electrical currents do not pass through the solenoids. During normal processing when thermocouple probes 15 must be retracted, solenoids 19 have no electrical current passing through them. As described before, this operating mode can be established by using a pair of ring-shaped permanent magnets or by using a compression spring to retract the probe when the solenoid power is turned off.

Figure 3A:
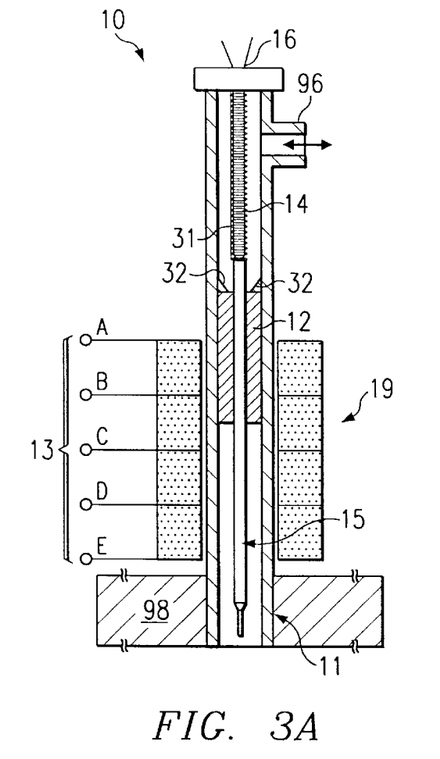
FIG. 3A shows another embodiment of the present invention in the retracted or idle position.
Figure 3B:
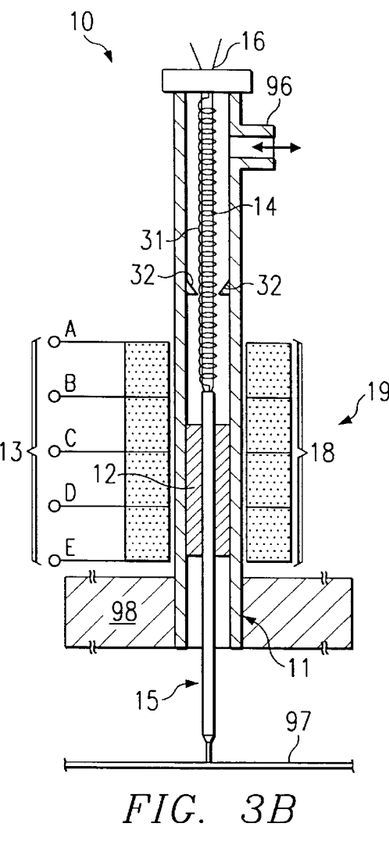
FIG. 3B shows the same embodiment of the present invention in the extended or activated position.

FIGS. 3A and 3B illustrate an embodiment of the present invention where the solenoid only requires current during the autocalibration cycle when the probe must be extended. Thus, thermocouple probe 15 stays in the retracted position during normal operation with no current passing through the solenoid 19. In this embodiment, the solenoids only require electrical current during the autocalibration cycles (approximately 0.1% of the machine time). This mode enhances the operation lifetime of the solenoids.

The schematic diagrams of FIGS. 3A and 3B show solenoid actuated thermocouple calibration probe 10 containing thermocouple probe 15 with 4-coil solenoid 19. FIG. 3A shows thermocouple probe 15 retracted, while FIG. 3B shows thermocouple probe 15 extended. As previously discussed, calibration probe 10 containing thermocouple probe 15 is embedded in showerhead assembly 98 with the end of the stainless steel tubing of probe housing 11 aligned with showerhead assembly 98 injector plate. Thermocouple probe 15 attaches to compression spring 31 to position thermocouple probe in the retracted position when no current passes through the solenoid coils 18 (as discussed before, a pair of ring-shaped permanent magnets may be used instead of mechanical compression springs). Thermocouple lead wires 14 attach to the top of thermocouple probe 15 and extend to top vacuum-grade thermocouple feedthrough terminals 16. Thermocouple lead wires 14 can be constructed long enough to accommodate the full up and down motion of thermocouple probe 15. When thermocouple probe 15 is in the retracted position, stopper tab 32 coupled to probe housing 11 holds thermocouple probe 15 in a position such that the temperature sensing tip of thermocouple probe 15 is fully retracted within showerhead assembly 98 so that it does not interfere with wafer processing.

A purge gas flow from pump/purge line 96 can be used within probe housing 11 to prevent the process reactants and byproducts from entering probe housing 11. As shown in FIGS. 3A, and 3B, a purge gas flow (such as Ar or $N_2$) may be introduced into probe housing 11 through a pump/purge line 96 coupled to the upper portion of probe housing 11. Using purge gas flow can prevent unwanted depositions on the thermocouple probe 15 and within probe housing 11 in Rapid Thermal Chemical-Vapor Deposition (RTCVD) applications. Moreover, pump/purge line 96 can also pump out probe housing 11 during a chamber pump-down cycle in order to rapidly establish RTP equipment base pressure in vacuum RTP systems.

Figure 3C:
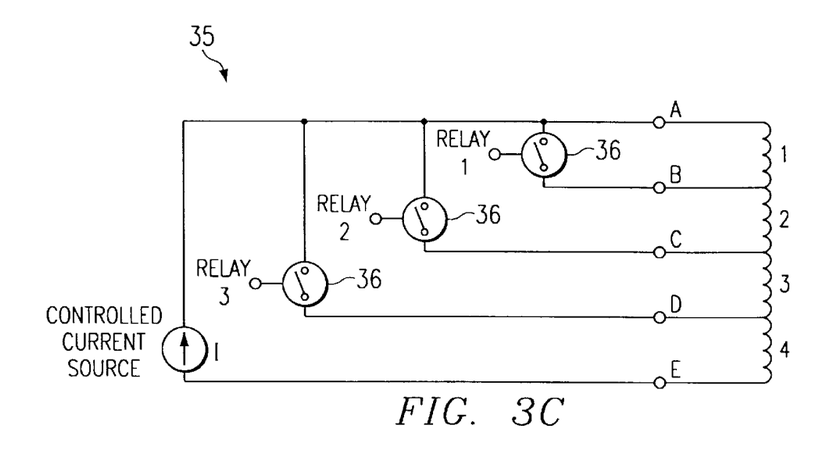
FIG. 3C shows one embodiment of a driver circuit used for controlling the probe's positions in the present invention.

FIG. 3C shows solenoid driver circuit 35 that can be used in conjunction with the embodiment of the calibration probe shown in FIGS. 3A and 3B. Solenoid circuit 35 includes three relays 36 labeled relay 1 associated with coil terminal B, relay 2 associated with coil terminal C and relay 3 associated with coil terminal D. Solenoid circuit 35 receives control signals to open and close relays 1, 2, and 3. The embodiment of FIG. 3C is illustrative in order to demonstrate basic functionality of the solenoid probe actuation. The solenoid circuit could include additional relays 36 if solenoid actuator 19 included additional solenoid coil sections 18.

During operation of RTP system 20 of FIG. 3A, calibration probe 10 is positioned as shown with no current passing through solenoid 19 and stopper 32 holding thermocouple probe 15 in the retracted position. When no electrical current passes through solenoid coils 28, no magnetic force affects ferromagnetic jacket 12 surrounding thermocouple probe 15. Ferromagnetic jacket 12 has a finite length and is positioned near the upper portion (nearer coil 1 than coil 4) of the solenoid coil structure surrounding probe housing 11. During an autocalibration cycle, thermocouple probe 15 moves down for a soft contact landing on wafer 97 as shown in FIG. 3B with thermocouple probe 15 in the extended position and temperature sensor 15 contacting the wafer. Thermocouple probe 15 of FIG. 3B extends due to the application of an adjustable current source to solenoid circuit 35 between coil terminals A and E with remote-controlled relays 1, 2, and 3 open as shown in FIG. 3C. As a result, the electrical current flows through all of solenoid coils 19 (between coil terminals A and E). As the current magnitude increases, an increasing downward force is applied to ferromagnetic jacket 12 in opposition to the compression spring force of spring 31. When thermocouple probe 15 approaches the equilibrium position (when the center point of ferromagnetic jacket 12 approaches the center position of solenoid 19), relay 1 is closed. The closing of relay 1 results in a short to bypass solenoid coil 1 contained between coil terminals A and B. As a result, the electrical current now flows through the coil sections formed in series between terminals B and E (i.e., coils 2–4), resulting in a lower equilibrium point for the ferromagnetic jacket 12. This causes thermocouple probe 15 to lower to the new equilibrium position for ferromagnetic jacket 12. Again the current may be ramped in order to gradually establish the lower thermocouple probe 15 position. Subsequently, relay 2 is closed, bypassing coil sections between coil terminals A and C such that electrical current now only flows between terminals C and E. This condition will apply an additional downward force since ferromagnetic jacket 12 is attracted to the center point of the coil sections between terminals C and E. Thus, thermocouple probe 15 moves further downward. Finally, if more travel is needed, relay 3 is closed in order to bypass the coil sections between terminals A and D. As a result, the electrical current passes only through the coil section between terminals D and E, ferromagnetic jacket 12 is attracted further downward towards the center of the lower coil section (coil 4) between coil terminals D and E, moving the thermocouple 15 further towards the wafer 97. As the current to solenoid coil section 4 increases, thermocouple probe 15 moves towards a soft contact landing position on the wafer 97 within the RTP system 20 process chamber. The thermocouple probe 15 contact force can be controlled by controlling the electrical current magnitude flowing through the coil section.

Real time measurement of the probe position can be obtained by applying a small alternating current signal superimposed on the direct current actuation signals. The alternating current is used to measure the inductance of the coil at the particular frequency. The frequency for the inductance measurement is determined from the level of signal to noise obtainable for the inductance measurement. As the ferromagnetic jacket moves in relation of the coil, the inductance of the coil changes. A constant level ac signal applied to the coil is used to measure the inductance independent of the level of the dc signal used to actuate the probe.

After the probe achieves contact with the wafer, the RTP pyrometry sensor autocalibration routine is performed. After completion of the pyrometry autocalibration routine, thermocouple probe 15 is gradually retracted using the reverse of the procedure used for thermocouple probe 15 extension.

Figure 4:
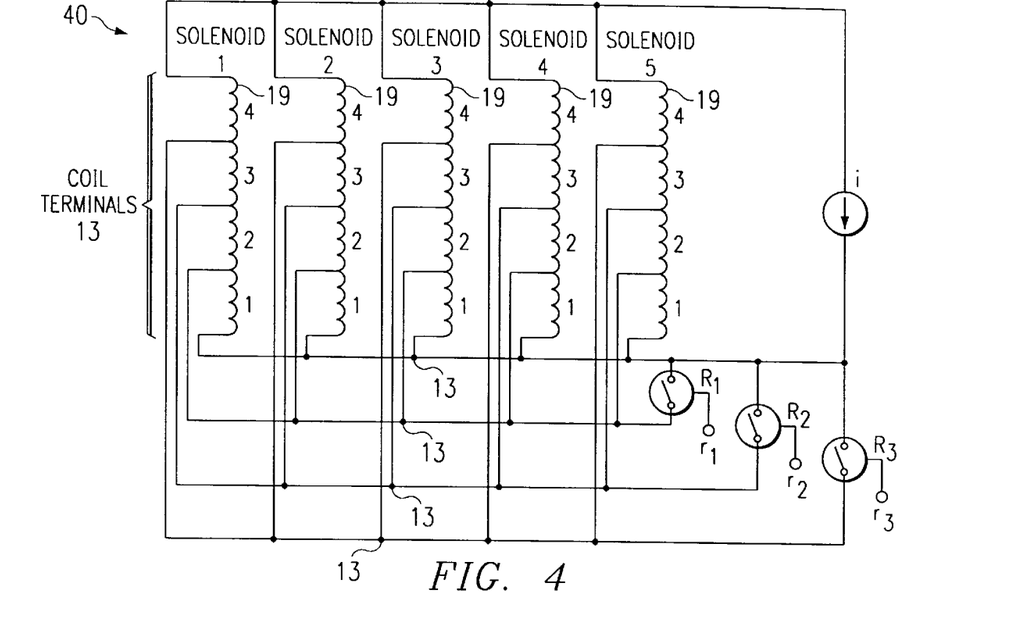
FIG. 4 shows one embodiment of a driver circuit used for a multi-point sensor calibration system in a combination of the present invention.

For calibration of multi-point pyrometry sensors, multiple thermocouple calibration probes 15 (five in the RTP system developed by CVC Products) are used. As shown in FIG. 4, solenoid driver circuit 40 provides the drive currents of five thermocouple probe solenoids 19 using a parallel circuit configuration. Solenoids 19 of FIG. 4 are shown inverted as compared to the solenoid coils of FIG. 3C. As shown in FIG. 4, one current source (with controllable amplitude) and three remote-controlled relays 41 are used to control the actuation (extension and retraction) of thermocouple probes 15. Solenoid coils 19 can again comprise a single coil or multiple coils 18. Coil terminals 13 terminate at the solenoid at varying heights to allow controlled retraction and extension of thermocouple probes 15.

Figure 5:
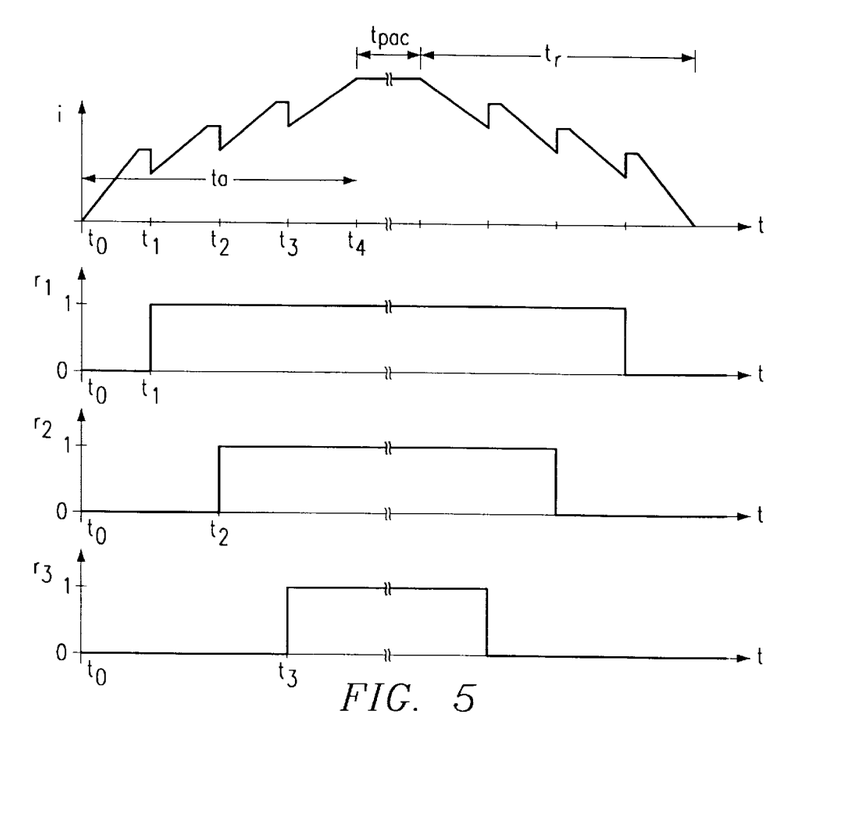
FIG. 5 shows graphs of current and switch states of the driver circuit of FIG. 3C.

The timing diagrams of FIG. 5 show the current source and relay controls for extending and retracting thermocouple probes 15 in a multi-probe system when performing an autocalibration cycle. Typically, the time to actuate or extend thermocouple calibration probes 15, $t_a$, is in the range of five to ten seconds (same as the time, $t_r$ to retract the probes). The pyrometry autocalibration time ranges from one to four minutes ($t_{pac}$). Thus, the total pyrometry autocalibration cycle, including the automatic wafer handling times, typically takes less than five minutes. FIG. 5 shows control diagrams of current, relay 1 state (open or closed), relay 2 state, and relay 3 state versus time (to include the actuation period, the autocalibration period, and the retraction period). FIG. 5 illustrates that all three relay switches are open at time $t_0$ representing the start of the autocalibration cycle. From time $t_0$ to time $t_1$ all three relays remain open (state 0) while the current is ramped until shortly before time $t_1$. At time $t_1$, the current drops when relay 1 closes (note that relays 2 and 3 remain open) resulting in movement of thermocouple probe 15 to a new equilibrium point (as described above). The current again gradually rises until shortly before time $t_2$. Relay 2 remains open until time $t_2$ when it closes (leaving only relay 3 open). From time $t_2$ to shortly before time $t_3$ the current again gradually increases. Relay 3 remains open until time $t_3$ at which all three relays are closed. The final extension of the thermocouple probe 15 is accomplished by increasing the current from time $t_3$ until time $t_4$ representing the start of the autocalibration cycle. All three relays remain closed during the autocalibration cycle. The probe 15 contact force over the wafer is controlled by the amount of solenoid actuation current passing through the lower solenoid coil. Upon completion of the autocalibration cycle, thermocouple 15 is retracted by reversing the steps described from time $t_0$ through time $t_4$ (decreasing current and closing relays until the thermocouple probe 15 is in the retracted position).

Figure 7:
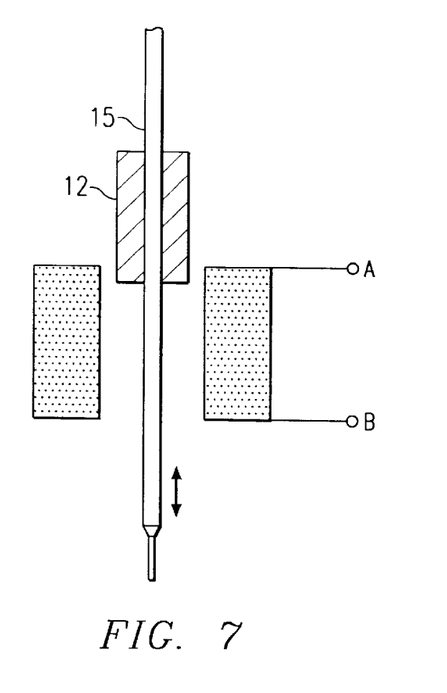
FIG. 7 shows an embodiment of the present invention incorporating a ferromagnetic jacket.
Figure 8:
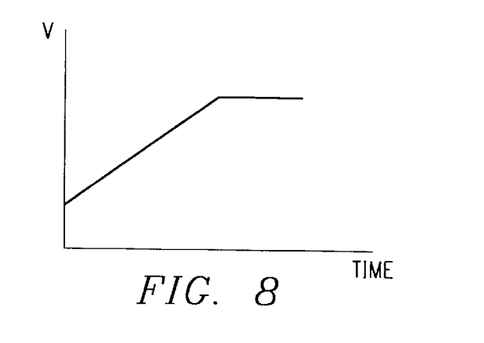
FIG. 8 shows a graph of a voltage ramp that could be used to control the motion of the embodiment of FIG. 7.
Figure 9:
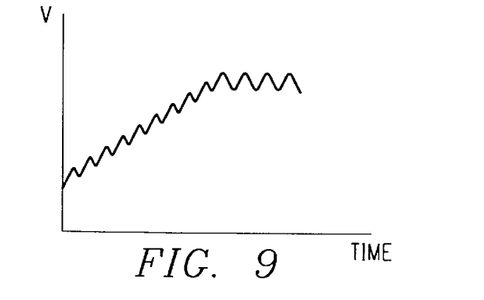
FIG. 9 shows a graph of an AC signal that could be used to measure the inductance of coil AB in the embodiment of FIG. 7.
Figure 10:
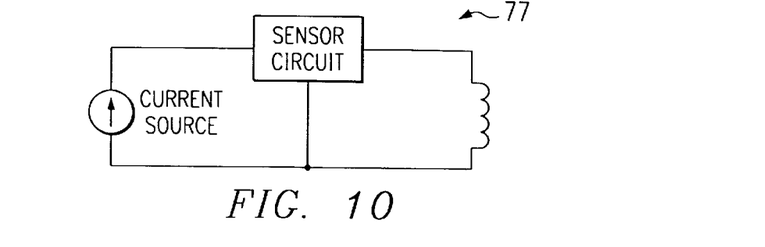
FIG. 10 shows an embodiment of a sensor circuit that could be used to sense the position of the probe of FIG. 7.

The solenoid coils can also act as a position sensor to sense the position of the thermocouple probe 15. As shown in FIG. 7, as the ferromagnetic jacket 12 moves in relation to a coil (shown as coil AB), the inductance of the coil, as measured across terminals AB, will vary. Specifically, the inductance will increase as the ferromagnetic jacket 12 is lowered past the coil. FIG. 8 illustrates an example of a voltage (or current) ramp that can be used to control the motion of thermocouple probe 15. FIG. 9 illustrates the superposition of the A.C. signal used to measure the inductance of the coil and therefore the position of the thermocouple probe 15. The position sensor circuit 77 of FIG. 10 can be inserted within the existing actuation circuit.

A typical autocalibration cycle involves a closed-loop or open-loop slow wafer temperature ramp. The closed-loop temperature ramp may be performed by performing closed-loop temperature control using either extended thermocouple calibration probes 15 or using RTP pyrometry sensors 22 to provide the multi-variable controller signals. In general, closed-loop calibrations using extended thermocouple probes 15 is preferred over open-loop power ramp or closed-loop temperature ramp using the RTP pyrometry sensors in the control loop. RTP pyrometry autocalibration cycles using closed-loop temperature ramps with the signals from extended thermocouple probe 15 in the control loop are generally preferred over signals from the pyrometry sensors 22 because they allow controlled temperature ramp-up (from room temperature or near room temperature) to a maximum calibration temperature (e.g., 1150° C.) and controlled temperature ramp down from the maximum calibration temperature. This can be performed using a proven multi-zone multi-variable control algorithm in order to ensure wafer temperature uniformity throughout the entire autocalibration thermal cycle.

Figure 6:
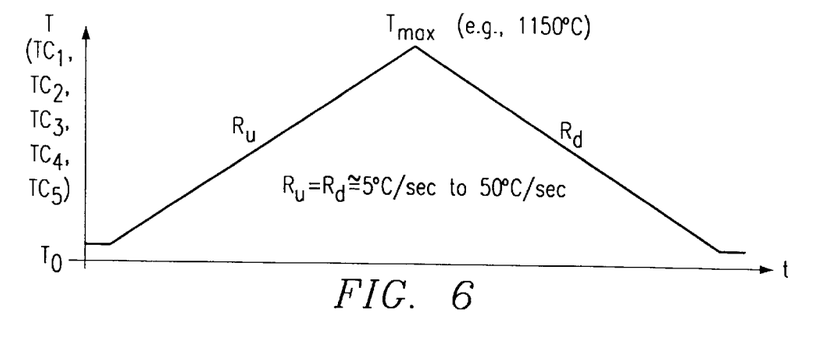
FIG. 6 shows a graph of a typical temperature profile during a calibration cycle.

FIG. 6 shows a schematic diagram of the thermal trajectory of the autocalibration cycle in a typical RTP system 10. The temperature ramp rate during the controlled ramp autocalibration routine can be slow enough (approximately 10° C./sec) that the thermocouple probes 15 remain in quasi-thermal equilibrium with wafer 97 during the ramp-up ($R_u$) and ramp-down ($R_d$) portions of the controlled thermal cycle shown in FIG. 6. A data acquisition system can collect real-time temperature measurements from RTP multi-point pyrometry sensors 22 and extended calibration thermocouple probes 15. The data for pyrometry sensors 22 and thermocouple probes 15 can be collected in real time during the entire heat-up and cool-down period. The calibration data obtained from the temperature ramp-up period must closely track those data extracted from the temperature ramp-down period. A good match between the ramp-up ($R_u$) data and the ramp-down ($R_d$) data implies a sufficiently slow thermal ramp speed that will accommodate the thermocouple probe 15 response delay. A notable discrepancy (>2° C.) between the calibration data obtained during the ramp-up and ramp-down periods implies that the temperature ramp rate used during the autocalibration cycle may be excessive or too large. If so, another autocalibration cycle with slower heat-up and cool-down rates must be used. A key assumption for operation of the proposed autocalibration technique of this invention is that the frontside and backside wafer temperatures are essentially equal and the temperature gradient across the wafer thickness is negligible (e.g., $\leq 2°$ C.). This is a good assumption, particularly in CVC's RTP system using a highly reflective showerhead.

The autocalibration routine can also be preprogrammed in the RTP process control computer to allow the operator to initiate an autocalibration routine via the computer user interface. Moreover, the process control computer may keep track of the autocalibration history over a number of autocalibration cycles to identify short-term and/or long-term calibration drifts for diagnostic purposes and monitoring of the RTP equipment state drifts.

As discussed before, FIG. 1 shows a preferred embodiment for implementation of the in-situ thermocouple calibration probes 10 in an RTP system. This embodiment does not include mechanical spring 31 and stopper 32, but rather holds thermocouple probe 15 in the retracted position using permanent magnet spring 120 as shown. Permanent magnet spring 120 includes outer permanent magnet ring 121 fixably attached to probe housing 11 and inner permanent magnet ring 122 or ferromagnetic ring fixably attached to thermocouple probe 15. Outer magnet 121 has an opposing magnetic pole arrangement with respect to inner magnet 122 to hold thermocouple probe 15 at a determined position. In the case of ferromagnetic rings, the attraction between the magnet and the ferromagnetic piece holds the probe. Thermocouple probe 15 of the embodiment of FIG. 1 also contains lower jacket 125 fixably coupled about thermocouple probe 15 at a position lower than the ferromagnetic jacket 12. This lower jacket 125 serves to align thermocouple probe 15 along a vertical axis. If desired, the lower probe jacket 125 can be made of a ferromagnetic material in order to provide additional flexibility for probe movement.

During an autocalibration cycle, thermocouple probe 15 can be extended and retracted using the solenoid-actuated coils for in-situ autocalibration. For the embodiment of FIG. 1, the thermocouple probe can extend through segmental activation of the solenoid coils AB, BC, CD, and DE (DE remains activated using a current flow during the probe contact) as described earlier. Thermocouple probe 15 retraction requires switching the solenoid current sequentially from coil DE to coils CD, to coil BC and to coil AB. The solenoid activation is then switched immediately from Coil AB to CD and finally to BC. This procedure acts on lower ferromagnetic jacket 125 to position thermocouple calibration probe 15 to allow permanent magnet 120 to hold or capture thermocouple probe 15 in a stable retracted position, after which the actuator current can be turned off. The last two solenoid activation steps (from coil AB to coil CD and from coil CD to coil BC) apply the upward force to lower ferromagnetic jacket cylinder 125, whereas the first probe retraction steps apply the upward force to upper ferromagnetic jacket 12. During the last solenoid activation step (current through Coil BC), thermocouple probe 15 is held in a stable retracted position by the action of permanent magnetic spring 120. Teflon layer 101 of ferromagnetic cylinders 12 and 125 can allow smooth up/down motion of the thermocouple probe 15 within the polished stainless steel tubing of probe housing 11.

As shown on FIG. 1, pump/purge line 96 can be used to keep the reactive process gases away from calibration probe housing 11 during wafer processing. Pump/purge line 96 can also be used to pump out the residual gas molecules from the calibration probe housing 11 during a process chamber pump-down cycle. Preferably, in-situ autocalibration should be performed in an inert ambient environment such as Argon and at a process chamber above 10 Torr (to provide a good and repeatable thermal contact aided by thermal conduction through the gas between thermocouple probe 15 and wafer 97).

In summary, the present invention provides an RTP compatible automatic calibration system and method for calibrating a substrate temperature sensor in substrate thermal processing equipment such as in RTP systems. The calibration system includes an in-situ temperature-sensitive probe associated with the substrate temperature sensor to calibrate the substrate temperature sensor and an actuator to position the temperature-sensitive probe relative to the substrate during a calibration cycle. The actuator and temperature-sensitive probe of the automatic calibration system can be incorporated into the thermal processing equipment in order to maintain the thermal processing equipment integrity during a calibration cycle. The present invention allows for calibration of substrate temperature sensors in RTP and like systems without a requirement for manually loading TC-bonded wafers, without compromising the vacuum integrity of the process chamber, and without exposing the process chamber to environmental contamination during the calibration cycle.

Although the present invention has been described in detail, it should be understood that various changes, substitutions and alterations can be made hereto without departing from the spirit and scope of the invention as described by the appended claims.

What is claimed is:

1. An automatic calibration method for in-situ calibration of at least one substrate temperature sensor in a microelectronics manufacturing equipment for processing a substrate, comprising:

extending at least one in-situ temperature-sensitive probe onto the substrate located within a process chamber of said manufacturing equipment while maintaining the process ambient integrity of the process chamber;

ramping the substrate temperature between a first temperature and a second temperature at a sufficiently slow rate;

collecting a set of substrate temperature measurement data from said substrate temperature sensor and said temperature-sensitive probe in real time using an automated data acquisition system;

extracting a set of calibration data for said substrate temperature sensor; and retracting and at least one temperature-sensitive probe away from said substrate upon conclusion of a calibration cycle; and calibrating any further substrate temperature measurement data obtained with said substrate temperature sensor using said calibration data.

2. The automatic calibration method of claim 1 wherein said substrate temperature ramping rate is optimized according to the response times of said substrate temperature sensor and said temperature-sensitive probe.

3. The automatic calibration method of claim 1 wherein said substrate temperature ramping comprises a controlled substrate temperature ramp-up cycle with a first ramp rate ranging from approximately 1° C. per second to approximately 50° C. per second.

4. The automatic calibration method of claim 3 wherein said substrate temperature ramping further comprises a controlled substrate temperature ramp-down cycle with a second ramp rate ranging from approximately 1° C. per second to approximately 50° C. per second.

5. The automatic calibration method of claim 4 wherein said first ramp rate for said substrate temperature ramp-up cycle and said second ramp rate for said ramp-down cycle are chosen to be sufficiently small such that the calibration data obtained from the temperature ramp-up cycle are consistent with the calibration data obtained from the temperature ramp-down cycle.

6. The automatic calibration of claim 1 wherein said substrate temperature ramping further comprises a closed-loop substrate temperature ramping using a substrate temperature controller employing the real-time substrate temperature measurement data from said temperature-sensitive probe for a closed-loop control function.

7. The automatic calibration method of claim 1 wherein said manufacturing equipment further comprises a single-wafer rapid thermal processing equipment.

8. The automatic calibration method of claim 1 wherein said extending and said retracting further comprise positioning said at least one temperature-sensitive probe using real-time closed-loop control of an electromechanical actuator.

9. The method of claim 1 wherein said retracting said at least one temperature-sensitive probe step further comprises the step of retracting said temperature-sensitive probe into a protective probe housing.

10. The method of claim 1 wherein said extending said at least one temperature-sensitive probe step further comprises the step of extending said temperature-sensitive probe to contact said substrate while said substrate remains non-rotating.

* * * * *